United States Patent [19]

McGee et al.

[11] 4,326,109  
[45] Apr. 20, 1982

[54] APPARATUS FOR COUPLING A TWO-WAY TRANSMISSION PATH TO A ONE-WAY TRANSMITTING PATH AND A ONE-WAY RECEIVING PATH

[75] Inventors: William F. McGee, Nepean, Canada; Wasfy B. Mikhael, Morgantown, W. Va.

[73] Assignee: Northern Telecom Limited, Montreal, Canada

[21] Appl. No.: 138,839

[22] Filed: Apr. 11, 1980

[51] Int. Cl.³ .............................................. H04B 1/58
[52] U.S. Cl. ............................................. 179/170 NC
[58] Field of Search ........ 179/170 T, 170 NC, 170 D, 179/170.2; 370/38, 24, 27; 455/78, 79, 82; 333/109, 112; 343/820, 850, 852, 858

[56] References Cited

U.S. PATENT DOCUMENTS

| | | | |
|---|---|---|---|
| 1,666,206 | 4/1928 | Hartley | 333/138 |
| 3,329,897 | 7/1967 | Preble | 455/78 |
| 3,490,054 | 1/1970 | Seidel | 333/109 |
| 3,530,260 | 9/1970 | Gaunt | 179/170 NC |
| 3,559,042 | 1/1971 | Gingell | 361/76 |
| 3,740,756 | 6/1973 | Sosin | 333/117 |
| 3,810,182 | 5/1974 | White et al. | 179/170 NC |
| 3,823,272 | 7/1974 | Tabalba | 179/170 T |
| 3,849,609 | 11/1979 | Voorman | 179/170 NC |
| 3,899,643 | 8/1975 | Tabalba | 179/81 B |
| 4,123,712 | 10/1978 | Mikhael | 455/109 |

Primary Examiner—Bernard Konick  
Assistant Examiner—Randall P. Myers  
Attorney, Agent, or Firm—R. John Haley

[57] ABSTRACT

A one-way receiving path is connected to the input side of a first phase-shift network which produces signals in phase quadrature at its output side, which is connected to the input side of a second phase-shift network which is conjugate to the first and whose output side is connected to a one-way transmitting path. A two-way transmission path and a balancing impedance are connected to the junction between the phase-shift networks. The arrangement provides a balanced or unbalanced hybrid circuit. Each phase-shift network can comprise a symmetrical polyphase network with cascaded network sections for handling voice frequency signals.

5 Claims, 2 Drawing Figures

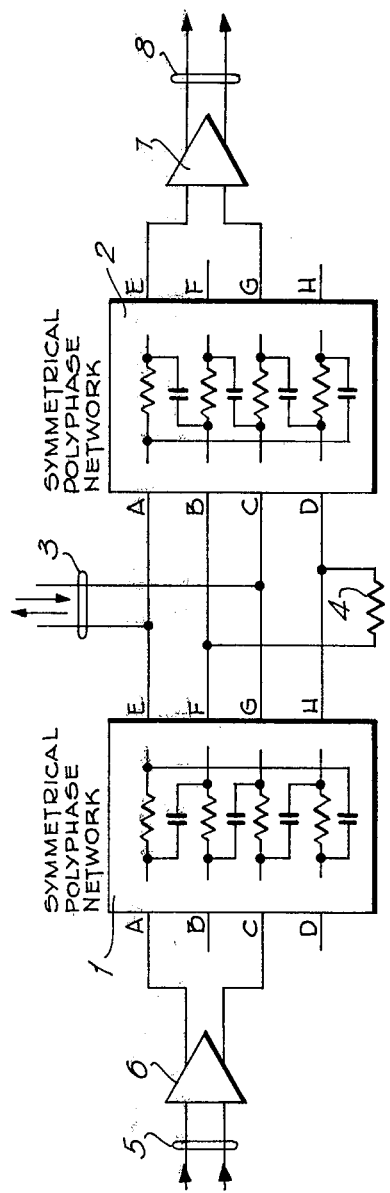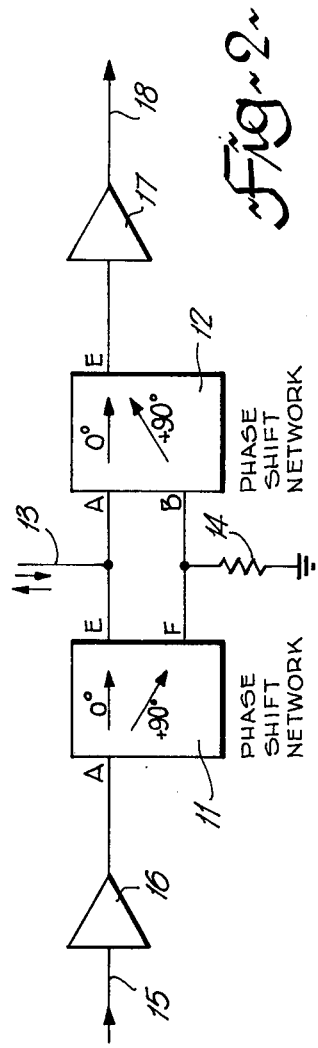

APPARATUS FOR COUPLING A TWO-WAY TRANSMISSION PATH TO A ONE-WAY TRANSMITTING PATH AND A ONE-WAY RECEIVING PATH

This invention relates to apparatus for coupling a two-way transmission path to a one-way transmitting path and a one-way receiving path.

It has long been known to couple a two-way transmission path, such as a 2-wire telephone line, to a one-way transmitting path and a one-way receiving path, such as a 4-wire line, via a hybrid transformer. The use of hybrid transformers involves various disadvantages; in particular for handling voice-frequency signals such transformers are undesirably large.

In order to avoid such disadvantages, various forms of hybrid circuit, using solid state components and avoiding the use of inductive components have been provided to replace the hybrid transformer. Examples of such known forms of hybrid circuit are disclosed in Gaunt U.S. Pat. No. 3,530,260 issued Sept. 22, 1970; Tabalba U.S. Pat. Nos. 3,823,272 issued July 9, 1974 and 3,899,643 issued Aug. 12, 1975; and Voorman U.S. Pat. No. 3,849,609 issued Nov. 19, 1974.

The present invention seeks to provide a novel form of hybrid circuit which utilizes phase-shift networks. Whilst various forms of phase-shift network may be used in the present invention, a particularly suitable and preferred form of phase-shift network is a symmetrical polyphase network of the type disclosed in Gingell U.S. Pat. Nos. 3,559,042 issued Jan. 26, 1971 or in Mikhael 4,123,712 issued Oct. 31, 1978.

According to one aspect of this invention there is provided apparatus for coupling a two-way transmission path to a one-way transmitting path and a one-way receiving path, comprising: a first phase-shift network having an input and two outputs at which a signal supplied to said input is produced in phase quadrature; a second phase-shift network having two inputs, which are connected to the outputs of the first phase-shift network, and an output, the second phase-shift network being conjugate to the first whereby a signal applied to the input of the first network and produced in phase quadrature at the outputs of the first network is not produced at the output of the second network; and means for connecting the two-way transmission path to one of the outputs of the first network, a balancing impedance to the other of the outputs of the first network, the one-way transmitting path to the output of the second network and the one-way receiving path to the input of the first network.

According to another aspect of this invention there is provided a 2-wire/4-wire hybrid circuit comprising: a first phase-shift network having two inputs and four outputs at which a four-phase signal is produced in response to a differential signal supplied to said inputs; a second phase-shift network having four inputs, which are connected to the outputs of the first phase-shift network, and two outputs, the second phase-shift network being conjugate to the first whereby a differential signal supplied to the inputs of the first network and resulting in a four-phase signal at the outputs of the first network results in no signal being produced at the outputs of the second network; and means for connecting the receiving wires and the transmitting wires of a 4-wire line respectively to the inputs of the first network the outputs of the second network, and for connecting the wires of a 2-wire line to two inversely-related outputs of the first network, and for connecting a balancing impedance, equivalent to the impedance of the 2-wire line, between the other inversely-related outputs of the first network.

The invention will be further understood from the following description of embodiments thereof with reference to the accompanying drawings, in which:

FIG. 1 schematically illustrates a balanced 2-wire/4-wire hybrid circuit which utilizes symmetrical polyphase networks; and FIG. 2 schematically illustrates an unbalanced hybrid circuit which utilizes phase-shift networks.

Referring to FIG. 1, the hybrid circuit shown therein comprises two symmetrical polyphase networks 1 and 2 each of which has four inputs A, B, C, and D and four outputs E, F, G, and H, for four-phase signals. The outputs E, F, G, and H of the network 1 are connected directly to the inputs A, B, C, and D respectively of the network 2. The inversely-related outputs E and G of the network 1 are also connected to the wires of a 2-wire line 3, and the inversely-related outputs F and H of the network 1 are interconnected via a balancing impedance 4 which has the same impedance as the 2-wire line 3.

The two receiving wires 5 of a 4-wire line are connected via a buffer amplifier 6 to the inversely-related inputs A and C respectively of the network 1. The inversely-related outputs E and G of the network 2 are connected via a buffer amplifier 7 to the two transmitting wires 8 of the 4-wire line. The inputs B and D of the network 1, and the outputs F and H of the network 2, are terminated with impedances (not shown) which match the output impedance of the buffer amplifier 6 and the input impedance of the buffer amplifier 7, respectively, so that the overall arrangement remains balanced. In this manner the four-phase networks 1 and 2 are arranged respectively to receive differential signals (i.e. signals which are inverse to one another) from the wires 5 and to transmit differential signals to the wires 8.

Each of the symmetrical polyphase networks 1 and 2 consists of a plurality of cascaded symmetrical polyphase network sections each having a notch at a respective frequency. For example, each network 1 or 2 has from two to six cascaded sections with different notch frequencies within the voice frequency band, so that the networks 1 and 2 can pass voice frequency signals so that the hybrid circuit can be used in, for example, telephone equipment. Each of the networks 1 and 2 can be of any known form. Various forms of symmetrical polyphase network including cascaded sections are known from Gingell U.S. Pat. Nos. 3,559,042 and Mikhael 4,123,712, and in particular any of these forms of network can be used for the networks 1 and 2.

A feature of the present invention is that the networks 1 and 2 are conjugate networks. As is known, a polyphase network generates at its outputs, from an input signal, signals which are shifted in phase relative to one another. In the case of the networks 1 and 2 each of which has four outputs, the signals at the outputs E to G are progressively shifted, or rotated, in phase by 90° from one output to the next. The direction of this phase or rotation for the network 2 is opposite to that for the network 1; this is what is meant by the networks being conjugate.

For example, each of the networks 1 and 2 can be formed by cascaded sections, one of which is illustrated in each of the network blocks 1 and 2 in FIG. 1, each of which consists of four series resistors and four capacitors which are cross-coupled each between the input end of one resistor and the output end of an adjacent resistor. In the network 1 the capacitors in each of the cascaded sections are connected in the direction from the inputs A, B, C, and D to the outputs F, G, H, and E respectively, whereas in the network 2 the capacitors in each of the cascaded sections are connected in the direction from the inputs A, B, C, and D to the outputs H, E, F, and G respectively. Thus in the sections of the networks 1 and 2 the capacitors are connected with opposite senses, thus rendering the networks conjugate.

As a result of the connection of the conjugate networks, signals received via the wires 5 are transmitted to the line 3, and signals received via the line 3 are transmitted to the wires 8, but signals received via the wires 5 are not transmitted to the wires 8, as more fully described below. Thus the conjugate networks 1 and 2 provide the desired property of a 2-wire/4-wire hybrid circuit of isolating the receiving and transmitting paths of the 4-wire line from one another whilst providing for transmission between these and the 2-wire line.

The above characteristics of the arrangement of FIG. 1 arise as follows:

A signal V, −V received via the 2-wire line 3 results in signals V, O, −V, and O being present at the inputs A, B, C, and D respectively of the network 2, assuming that there is no signal on the wires 5. These signals result in signals $V'$, $-jV'$, $-V'$, and $jV'$ being produced at the outputs E, F, G, and H respectively of the network 2, where $V'$ is linearly related to V. The signal $V'$ and $-V'$ at the outputs E and G are passed via the buffer amplifier 7 to the wires 8. Thus there is transmission from the line 3 to the wires 8.

A signal received via the wires 5 results in signals V, O, −V, and O being applied to the inputs A, B, C, and D respectively of the network 1. Assuming that no signal is received via the line 3, these signals result in signals $V''$, $jV''$, $-V''$, and $-jV''$ being produced at the outputs E, F, G, and H respectively of the network 1, where $V''$ is linearly related to V. The different cyclical order of these output signals, compared with that as described above for the network 2, is the result of the fact that the networks are conjugate. The signals $V''$ and $-V''$ at the outputs E and G of the network 1 are conducted to the line 3. Thus there is transmission from the wires 5 to the line 3.

The signals $V''$, $jV''$, $-V''$, and $-jV''$ at the outputs of the network 1 are also applied to the inputs A, B, C, and D respectively of the network 2. These signals at the inputs of the network 2 would individually each produce signals at the outputs of the network 2 as indicated in the following table. However, as the signals are all present at the inputs of the network 2, the resultant signals are effectively summed at the outputs of the network 2, as also shown in the table.

| In- | | Output | | | |
|---|---|---|---|---|---|
| put | Signal | E | F | G | H |
| A | $V''$ | $V'''$ | $-jV'''$ | $-V'''$ | $jV'''$ |
| B | $jV''$ | $j(jV''')$ | $jV'''$ | $-j(jV''')$ | $-(jV''')$ |
| C | $-V''$ | $-(-V''')$ | $j(-V''')$ | $-V'''$ | $-j(-V''')$ |
| D | $-jV''$ | $-j(-jV''')$ | $-(-jV''')$ | $j(-jV''')$ | $-jV'''$ |
| Output Sum | | 0 | 0 | 0 | 0 |

As can be seen from the table above, the summed output signal is zero at each of the outputs of the network 2. Thus there is no transmission of signals from the wires 5 to the wires 8.

FIG. 2 illustrates an unbalanced hybrid circuit, for connecting between an unbalanced two-way transmission wire 13 and a one-way receiving wire 15 and a one-way transmitting wire 18, which uses two conjugate phase-shift networks 11 and 12. The network 11 has one input A and two outputs E and F at which a signal supplied to the input A is produced in phase quadrature. The network 12 has two inputs A and B, which are connected to the outputs E and F respectively of the network 11, and an output E at which no signal is produced in response to the phase quadrature signals produced at the outputs of the network 11. The wire 15 is connected via a buffer amplifier 16 to the input A of the network 11, and the output E of the network 12 is connected via a buffer amplifier 16 to the wire 18. The outputs E and F of the network 11 are also connected respectively to the wire 13 and via a balancing impedance 14 to circuit ground. Although this hybrid circuit is connected to unbalanced lines, the impedance 14 is still provided to avoid providing unbalanced connections to the networks 11 and 12 which could adversely affect their phase-shift characteristics.

The network 11 provides, for example, a zero phase-shift in transmitting a signal from its input A to its output E, and a +90° phase-shift in transmitting a signal from its input A to its output F. The network 12 in this case provides phase-shifts of zero and +90° in transmitting signals from its inputs A and B respectively to its output E. A comparison of these characteristics of the networks 11 and 12 with the networks 1 and 2 of FIG. 1 as described above shows that the networks 11 and 12 are in fact conjugate networks and provide the desired transmission of signals from the wire 15 to the wire 13, and from the wire 13 to the wire 18, but not from the wire 15 to the wire 18.

Each of the phase-shift networks 11 and 12 can be any form of network providing the desired phase-shift; for example, each network can be in the form of a so-called Hartley modulator as disclosed in Hartley U.S. Pat. No. 1,666,206 of Apr. 17, 1928.

Whilst preferred embodiments of the invention have been described above, it should be appreciated that the invention is not restricted to these. In particular, it is observed that the phase-shift networks may comprise different forms of symmetrical polyphase network or other known 90° phase-shift networks such as resistor-capacitor networks and gyrators and networks using digital and charge-coupled devices.

What is claimed is:

1. Apparatus for coupling a two-way transmission path to a one-way transmitting path and a one-way receiving path comprising:
   a first phase-shift network having an input and two outputs at which a signal supplied to said input is produced in phase quadrature;
   a second phase-shift network having two inputs, which are connected to the outputs of the first phase-shift network, and an output, the second phase-shift network being conjugate to the first whereby a signal applied to the input of the first network and produced in phase quadrature at the outputs of the first network is not produced at the output of the second network; and
   means for connecting the two-way transmission path to one of the outputs of the first network, means for connecting a balancing impedance to the other of the outputs of the first network, the means for connecting one-way transmitting path to the output of the second network, and the means for connecting the one-way receiving path to the input of the first network.

2. Apparatus as claimed in claim 1 wherein said balancing impedance is equivalent to the impedance of the two-way transmission path, and is connected between said other of the outputs of the first network and circuit ground.

3. A 2-wire/4-wire hybrid circuit comprising:
a first phase-shift network having two inputs and four outputs at which a four-phase signal is produced in response to a differential signal supplied to said inputs;
a second phase-shift network having four inputs, which are connected to the outputs of the first phase-shift network, and two outputs, the second phase-shift network being conjugate to the first whereby a differential signal supplied to the inputs of the first network and resulting in a four-phase signal at the outputs of the first network results in no signal being produced at the outputs of the second network; and
means for connecting the receiving wires and the transmitting wires of a 4-wire line respectively to the inputs of the first network the outputs of the second network, and means for connecting the wires of a 2-wire line to two inversely-related outputs of the first network, and means for connecting a balancing impedance, equivalent to the impedance of the 2-wire line, between the other inversely-related outputs of the first network.

4. A hybrid circuit as claimed in claim 3 wherein each of said phase-shift networks comprises a symmetrical polyphase network.

5. A hybrid circuit as claimed in claim 4 wherein each symmetrical polyphase network comprises a plurality of cascaded network sections.

* * * * *

UNITED STATES PATENT AND TRADEMARK OFFICE
CERTIFICATE OF CORRECTION

PATENT NO. : 4,326,109
DATED : 20 April 1982
INVENTOR(S) : William Frederick McGEE and Wasfy Boushra MIKHAEL It is certified that error appears in the above-identified patent and that said Letters Patent are hereby corrected as shown below:

Claim 1, line 18: Delete "the" (third occurrence).

Claim 1, line 19: Insert --the-- after "connecting".

Claim 1, line 20: Delete "the" (second occurrence).

Signed and Sealed this

Thirty-first Day of August 1982

[SEAL]

Attest:

GERALD J. MOSSINGHOFF

Attesting Officer

Commissioner of Patents and Trademarks